(12) United States Patent
Tamura

(10) Patent No.: US 8,973,086 B2
(45) Date of Patent: Mar. 3, 2015

(54) MOBILE EQUIPMENT HAVING TELEVISION FUNCTION, METHOD OF STORING INFORMATION OF TELEVISION PROGRAM, AND PROGRAM OF STORING THE SAME

(71) Applicant: Noriko Tamura, Tokyo (JP)

(72) Inventor: Noriko Tamura, Tokyo (JP)

(73) Assignee: NEC Corporation, Tokyo (JP)

( * ) Notice: Subject to any disclaimer, the term of this patent is extended or adjusted under 35 U.S.C. 154(b) by 7 days.

(21) Appl. No.: 13/788,085

(22) Filed: Mar. 7, 2013

(65) Prior Publication Data

US 2013/0244725 A1 Sep. 19, 2013

Related U.S. Application Data

(63) Continuation of application No. 12/279,445, filed as application No. PCT/JP2007/050298 on Jan. 12, 2007, now Pat. No. 8,418,220.

(30) Foreign Application Priority Data

Feb. 14, 2006 (JP) ................................. 2006-036550

(51) Int. Cl.
*H04N 5/445* (2011.01)
*H04N 7/16* (2011.01)
*H04N 5/91* (2006.01)
*H04N 5/77* (2006.01)
*H04N 21/414* (2011.01)
*H04N 21/433* (2011.01)
*H04N 21/4782* (2011.01)
*H04W 88/02* (2009.01)
*H04N 9/82* (2006.01)

(52) U.S. Cl.
CPC ................. *H04N 5/91* (2013.01); *H04N 5/772* (2013.01); *H04N 7/163* (2013.01); *H04N 21/41407* (2013.01); *H04N 21/4334* (2013.01); *H04N 21/4782* (2013.01); *H04W 88/02* (2013.01); *H04N 9/8205* (2013.01)
USPC ................. 725/153; 725/39; 725/40; 725/41; 725/141; 725/142

(58) Field of Classification Search
USPC .............................. 725/153, 39, 40, 141, 142
See application file for complete search history.

(56) References Cited

U.S. PATENT DOCUMENTS 8,418,220 B2 * 4/2013 Tamura ......................... 725/153

* cited by examiner

*Primary Examiner* — Kieu Oanh T Bui
(74) *Attorney, Agent, or Firm* — Sughrue Mion, PLLC

(57) ABSTRACT

A mobile equipment having television function, which renders a user to watch a television program, characterized in that said mobile equipment comprises: a data storing section for storing image data and voice data transmitted through digital broadcast wave; and a display control section for conducting a display with a predetermined timing for confirming whether said user hopes to watch the television continuously or said user hopes that the television program being watched is stored, in a case that start of an application program preventing said user from continuing to watch said television program is indicated by said user.

26 Claims, 4 Drawing Sheets

FIG. 3

| TELEVISION CONTROL SECTION | EXECUTING | 31 |
| BROWSER FOR DATA BROADCASTING | PROPOSING | |
| COMMUNICATION BROWSER | STOPPING | |
| DISPLAY SECTION | DIVIDED DISPLAY | |

FIG. 4A

| TELEVISION CONTROL SECTION | EXECUTING | 31 |
| BROWSER FOR DATA BROADCASTING | PROPOSING | |
| COMMUNICATION BROWSER | STOPPING | |
| DISPLAY SECTION | DIVIDED DISPLAY | |

FIG. 4B

| TELEVISION CONTROL SECTION | STORAGE PREPARING | 31 |
| BROWSER FOR DATA BROADCASTING | STORAGE PREPARING | |
| COMMUNICATION BROWSER | PROPOSAL PREPARING | |
| DISPLAY SECTION | WHOLE SCREEN PREPARING | |

FIG. 4C

| TELEVISION CONTROL SECTION | STORING | 31 |
| BROWSER FOR DATA BROADCASTING | STORING | |
| COMMUNICATION BROWSER | PROPOSING | |
| DISPLAY SECTION | WHOLE SCREEN DISPLAY | |

FIG. 4D

| TELEVISION CONTROL SECTION | REPRODUCING | 31 |
| BROWSER FOR DATA BROADCASTING | REPRODUCING | |
| COMMUNICATION BROWSER | STOPPING | |
| DISPLAY SECTION | DIVIDED DISPLAY | |

MOBILE EQUIPMENT HAVING TELEVISION FUNCTION, METHOD OF STORING INFORMATION OF TELEVISION PROGRAM, AND PROGRAM OF STORING THE SAME

This application is continuation of U.S. patent application Ser. No. 12/279,445 filed on Aug. 14, 2008, which is a National Stage Entry of PCT/JP2007/050298 filed Jan. 12, 2007, which claims priority from Japanese Patent Application 2006-036550 filed Feb. 14, 2006, the contents of all of which are incorporated herein by reference, in their entirety.

TECHNICAL FIELD

The present invention relates to a mobile equipment, such as a mobile telephone apparatus having television receiving function, and the like, in particular to a mobile equipment having television function capable of recording a television program being watched by an user and rendering the user to watch the television program later, when an application program for displaying a whole screen is started by the user.

BACKGROUND TECHNIQUE

In recent years, a mobile telephone apparatus has various functions in addition to an original transmission function. A mobile telephone apparatus having television receiving function has also been known conventionally. It can be predicted that mobile telephone apparatuses thus having television receiving functions would be widely spread in accompany with starting of ground digital broadcasting targeting mobiles, such as a mobile telephone apparatus, and the like.

In the interim, the followings are known as conventional mobile telephone apparatuses having television receiving functions. For example, in order that a user, while watching a television program, may refer contents on a network other than broadcast wave, such as Internet (Hereunder, simply referred to HTML (Hyper Text Markup Language) contents) including information for the television program, a conventional mobile telephone apparatus disclosed in a official gazette of Unexamined Japanese Patent Publication 318163/2005 (Patent Reference 1) has URL (Uniform Resource Locator) of Web server providing the HTML contents, district information indicating which districts the user is now in, a memory storing a reception frequency of the television program being watched, and a rink button.

In a case that the user watching a television program refers the HTML contents including information for the television program by the use of the mobile telephone apparatus disclosed in the Patent Reference 1, the user operates the rink button. Thereby, in the mobile telephone apparatus, reception processing of the television program is, at first stopped, and the district information and the reception frequency of the television program both stored in the memory are then transmitted to the Web server.

In the Web server, based on the district information and the reception frequency transmitted from the mobile telephone apparatus, the television program being watched by the user is identified, and the HTML contents for the television program are then transmitted to the mobile telephone apparatus. In the mobile telephone apparatus, display and voice output are conducted by an Web browser capable of display in a whole screen in accordance with the HTML contents transmitted from the Web server. Thereafter, when the Web browser is terminated by the user, the reception processing of the television program is restarted in the mobile telephone apparatus, in accordance with the reception frequency stored in the memory.

According to the conventional technique disclosed in the Patent Reference 1, it becomes possible for the user to refer the HTML contents for the television program only by operating the rink button while watching the television program.

DISCLOSURE OF THE INVENTION

Problem to be Solved by the Invention

However, in the conventional technique disclosed in the Patent Reference 1, when the user operates the rink button to refer the HTML contents for the television program during watching the television program, the Web browser capable of display in the whole screen is started to display the HTML contents in the whole screen. This causes a problem that the user cannot watch contents of the television program broadcasted while displaying the HTML contents at all. Such a problem is inevitably caused to occur not only when the Web browser is started during watching the television program but also when the other application programs each conducting a display in a whole screen are started during watching the television program.

The present invention can provide a mobile equipment having television function, a method of storing information of the television program, and a computer program of storing the information of the television program that are capable of rendering the user to later watch contents of the television program broadcasted during the display in the whole screen by the application program for conducting the display in the whole screen, when the application program for conducting the display in the whole screen is started by the user during watching the television program.

Means for Solving the Problem

According to a first mobile equipment having television function of the present invention, which renders an user to watch a television program by receiving image data, voice data, contents for data broadcasting, such as BML (Broadcast Markup Language), HTML, and the like (Hereunder, simply referred to contents for data broadcasting) transmitted through digital broadcast wave and then conducting a display in accordance with the image data and the contents for data broadcasting as well as a voice output in accordance with the voice data, characterized in that the first mobile equipment comprises:

a data storing section; and a constitution for sequentially storing the image data and the voice data transmitted through the digital broadcast wave in the data storing section, in a case that start of an application program for conducting a display in a whole screen is indicated by the user during watching the television program.

According to a second mobile equipment having television function of the present invention, which renders an user to watch a television program by receiving image data, voice data, contents for data broadcasting transmitted through digital broadcast wave and then conducting a display in accordance with the image data and the contents for data broadcasting as well as a voice output in accordance with the voice data, characterized in that the second mobile equipment comprises:

a data storing section; and a constitution for sequentially storing the image data and the voice data transmitted through the digital broadcast wave in the data storing section and for rendering the user to watch the HTML contents instead of the television program, in a case that presentation of the HTML contents is indicated by the user during watching the television program.

According to a third mobile equipment having television function of the present invention, in the second mobile equipment having television function, further characterized in that the third mobile equipment having television function comprises:

a constitution for storing also the contents for data broadcasting transmitted through the digital broadcast wave in the data storing section in addition to the image data and the voice data, in a case that presentation of the HTML contents is indicated by the user during watching the television program.

According to a fourth mobile equipment having television function of the present invention, in the second mobile equipment having television function, further characterized in that the contents for data broadcasting include a link information to the HTML contents and that the fourth mobile equipment having television function comprises:

a constitution for storing the link information included in the contents for data broadcasting being displayed at the present in the data storing section, in a case that a request for storing the contents for data broadcasting is input by the user during watching the television program.

According to a fifth mobile equipment having television function of the present invention, in the fourth mobile equipment having television function, further characterized in that the link information is stored with correspondence to a television program identification information for identifying a television program being watched by the user at the present, when the link information is stored in the data storing section.

According to a sixth mobile equipment having television function of the present invention, the sixth mobile equipment having television function comprises:

a display section;
a voice output section;
a data storing section;
a digital broadcast wave receiving section for receiving digital broadcast waves including image data, voice data, and contents for data broadcasting;
a television control section which displays an image corresponding to the image data included in the digital broadcast waves received by the digital broadcast wave receiving section in a part of the display section and which outputs a voice corresponding to the voice data included in the digital broadcast waves from the voice output section;
a browser for data broadcasting which displays an image including the link information corresponding to the contents for data broadcasting included in the digital broadcast waves received by the digital broadcast wave receiving section in another part of the display section where no image is displayed by the television control section;
control section for determining whether contents of link destination of an operated link information are the HTML contents or the contents for data broadcasting, when the link information displayed in the display section is operated;
a communication browser which displays and outputs a voice corresponding to the HTML contents to the display section and the voice output section in spite of the television control section, in a case that the contents of link destination are determined by the control section to be the HTML contents; and
a storage control section for sequentially storing the image data and the voice data received by the digital broadcast wave receiving section in the data storing section, in a case that the contents of link destination are determined by the control section to be the HTML contents.

According to a seventh mobile equipment having television function of the present invention, in the sixth mobile equipment having television function, further characterized in that the storage control section also stores the contents for data broadcasting included in the digital broadcast waves received by the digital broadcast wave receiving section in addition to the image data and the voice data.

According to an eighth mobile equipment having television function of the present invention, in the sixth mobile equipment having television function, further characterized in that the storage control section stores the link information within the contents for data broadcasting displayed at the present in the display section in the data storing section, when a request of storing is input by the user.

According to a ninth mobile equipment having television function of the present invention, in the eighth mobile equipment having television function, further characterized in that the storage control section stores the link information with correspondence to a television program identification information for identifying a television program being watched at the present, when the storage control section stores the link information in the data storing section.

According to a first method of storing a television program information of the present invention, in a mobile equipment having television function which renders an user to watch a television program by receiving image data, voice data, contents for data broadcasting transmitted through digital broadcast wave and then conducting a display in accordance with the image data and the contents for data broadcasting as well as a voice output in accordance with the voice data, characterized in that the first method of storing a television program information sequentially stores the image data and the voice data transmitted through the digital broadcast wave in the data storing section, in a case that start of an application program for conducting a display in a whole screen is indicated by the user during watching the television program.

According to a second method of storing a television program information of the present invention, in a mobile equipment having television function which renders an user to watch a television program by receiving image data, voice data, contents for data broadcasting transmitted through digital broadcast wave and then conducting a display in accordance with the image data and the contents for data broadcasting as well as a voice output in accordance with the voice data, characterized in that the second method of storing a television program information sequentially stores the image data and the voice data transmitted through the digital broadcast wave in the data storing section and renders the user to watch the HTML contents instead of the television program, in a case that presentation of the HTML contents is indicated by the user during watching the television program.

According to a third method of storing a television program information of the present invention, in the second method of storing a television program information, further characterized in that the third method of storing a television program information also stores the contents for data broadcasting transmitted through the digital broadcast wave in the data storing section in addition to the image data and the voice data, in a case that presentation of the HTML contents is indicated by the user during watching the television program.

According to a fourth method of storing a television program information of the present invention, in the second method of storing a television program information, further characterized in that the contents for data broadcasting include a link information to the HTML contents and that the fourth method of storing a television program information stores the link information included in the contents for data broadcasting being displayed at the present in the data storing section, in a case that a request for storing the contents for data broadcasting is input by the user during watching the television program.

According to a fifth method of storing a television program information of the present invention, in the fourth method of storing a television program information, further characterized in that the link information is stored with correspondence to a television program identification information for identifying a television program being watched by the user at the present, when the link information is stored in the data storing section.

According to a first computer software program of the present invention, the first computer software program is to make a computer having a data storing section function as a mobile equipment having television function which renders an user to watch a television program by receiving image data, voice data, contents for data broadcasting transmitted through digital broadcast wave and then conducting a display in accordance with the image data and the contents for data broadcasting as well as a voice output in accordance with the voice data, characterized in that the first computer software program makes the computer function as means for sequentially storing the image data and the voice data transmitted through the digital broadcast wave in the data storing section, in a case that start of an application program for conducting a display in a whole screen is indicated by the user during watching the television program.

According to a second computer software program of the present invention, the second computer software program is to make a computer having a data storing section function as a mobile equipment having television function which renders an user to watch a television program by receiving image data, voice data, contents for data broadcasting transmitted through digital broadcast wave and then conducting a display in accordance with the image data and the contents for data broadcasting as well as a voice output in accordance with the voice data, characterized in that the second computer software program makes the computer function as means for sequentially storing the image data and the voice data transmitted through the digital broadcast wave in the data storing section and renders the user to watch the HTML contents instead of the television program, in a case that presentation of the HTML contents is indicated by the user during watching the television program.

According to a third computer software program of the present invention, in the second computer software program, further characterized in that the means also stores the contents for data broadcasting transmitted through the digital broadcast wave in the data storing section in addition to the image data and the voice data, in a case that presentation of the HTML contents is indicated by the user during watching the television program.

According to a fourth computer software program of the present invention, in the second computer software program, further characterized in that the contents for data broadcasting include a link information to the HTML contents and that the means stores the link information included in the contents for data broadcasting being displayed at the present in the data storing section, in a case that a request for storing the contents for data broadcasting is input by the user during watching the television program.

According to a fifth computer software program of the present invention, in the fourth computer software program, further characterized in that the means stores the link information with correspondence to a television program identification information for identifying a television program being watched by the user at the present, when the means stores the link information in the data storing section.

(Operation)

The mobile equipment having television function renders an user to watch a television program by receiving image data, voice data, contents for data broadcasting transmitted through digital broadcast wave and then conducting a display in accordance with the image data and the contents for data broadcasting as well as a voice output in accordance with the voice data. The mobile equipment having television function sequentially stores the image data and the voice data transmitted through the digital broadcast wave in the data storing section so as to render the user to watch the television program later, in a case that start of an application program for conducting a display in a whole screen is indicated by the user during watching the television program.

Effects of the Invention

According to the present invention, it is possible to obtain technical effects that an user can later watch the contents of the television program broadcasted while conducting a display in a whole screen by the application program, even if start of the application program for conducting the display in the whole screen is indicated by the user during watching the television program. The reason is that the image data and the voice data transmitted through the digital broadcast wave are sequentially stored in the data storing section, in a case that start of an application program for conducting a display in a whole screen is indicated by the user during watching the television program.

BRIEF DESCRIPTION OF THE DRAWINGS

FIG. 3 is a view for showing an example of contents of a management table 31 illustrated in FIG. 2;

FIG. 4A is a view for showing a manner in change of the contents of the management table 31 illustrated in FIG. 2;

FIG. 4B is a view for showing a manner in change of the contents of the management table 31 illustrated in FIG. 2;

FIG. 4C is a view for showing a manner in change of the contents of the management table 31 illustrated in FIG. 2;

FIG. 4D is a view for showing a manner in change of the contents of the management table 31 illustrated in FIG. 2;

DESCRIPTION OF REFERENCE NUMERALS

Figure 1:
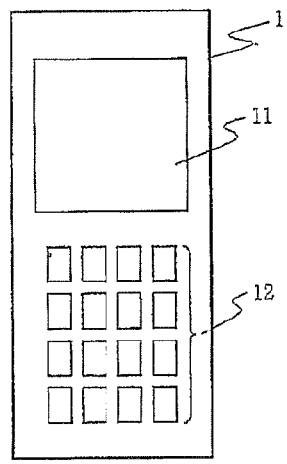
FIG. 1 is an external view for showing a mobile telephone apparatus 1 having television function according to a first embodiment of the present invention.

1 . . . mobile telephone apparatus having television function
11 . . . display section
12 . . . key input section
21 . . . input processing section
22a . . . television control section
22b . . . browser for data broadcasting
22c . . . communication browser
22d . . . condition management section
23a . . . storing control section
23b . . . data storing section
24 . . . control section
25 . . . wireless processing section
26 . . . voice processing section
26a . . . microphone
26b . . . speaker
27 . . . display control section
28 . . . movie processing section
29a . . . tuner data processing section
29b . . . tuner control section

BEST MODE FOR CARRYING OUT THE INVENTION

Hereunder, a detailed description is made about some preferable embodiments of the present invention with reference to the attached drawings.

Description of a Constitution in a First Embodiment

Referring to an external view of FIG. 1, a mobile telephone apparatus 1 having television function according to a first embodiment of the present invention includes, in external planes thereof, a display section 11 constituted by an LCD (Liquid Crystal Display) screen, an EL (Electro-Luminescence) screen, and the like, and a key input section 12 constituted by ten keys, function keys, and the like.

Figure 2:
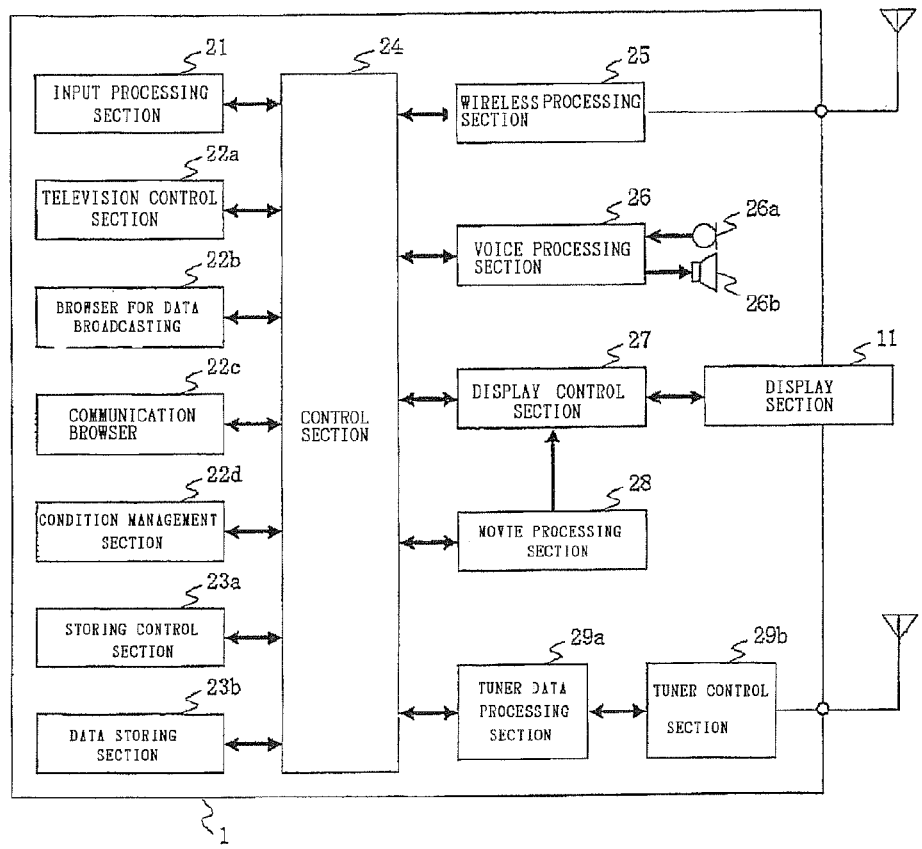
FIG. 2 is a block diagram for showing an example of constitution of the mobile telephone apparatus 1 having television function illustrated in FIG. 1.

Referring to a block diagram of FIG. 2, a mobile telephone apparatus 1 having television function according to a first embodiment of the present invention includes, in internals thereof, an input processing section 21, a television control section 22a, a browser for data broadcasting 22b, a communication browser 22c, a condition management section 22d, a storage control section 23a, a data storing section 23b, a control section 24, an wireless processing section 25, a voice processing section 26, a microphone 26a, a speaker 26b, a display control section 27, a display section 11, a movie processing section 28, a tuner data processing section 29a, and a tuner control section 29b. Besides, in the first embodiment, the tuner data processing section 29a, the tuner control section 29b, and a data storing section 23b are incorporated in the mobile telephone apparatus 1 having television function. Alternatively, they can be connected to the mobile telephone apparatus 1 having television function as external devices.

When various keys provided in a key input section 12 are operated by the user, the input processing section 21 has a function to inform the control section 24 of a content of the operation of the various keys.

The control section 24 has a function to control each section of the mobile telephone apparatus 1 having television function in accordance with the content of the operation of the various keys informed by the input processing section 21. The control section 24 has another functions, for example, to relay data and the like transferred between respective sections in the mobile telephone apparatus 1 having television function.

The television control section 22a has a function for rendering the user to watch the television program. More concretely, in a case that the user conducts a tuning operation by the use of the key input section 12, the television control section 22a has a function to indicate that a receiving frequency in the tuner control section 29b is changed into a frequency of a broadcasting station selected by the user. The television control section 22a has another functions, for example, to output image data and voice data of a television program being watched at the present and provided from the tuner data processing section 29a to the movie processing section 28 and the voice processing section 26, respectively.

The browser for data broadcasting 22b has a function to make the display section 11 display an image including link information, such as link button, and the like, in accordance with contents described by the data broadcasting output from the tuner data processing section 29a (contents for data broadcasting). The browser for data broadcasting 22b has another functions, for example, to transfer URL indicating link destination of the link information to the control section 24, in a case that the link information displayed in the display section 11 is operated by the user.

The communication browser 22c is such one as realized by the application program for conducting the display in the whole screen. The communication browser 22c has functions, for example, to output image and voice in accordance with HTML contents on Internet (contents described by HTML or compact-HTML) received through the wireless processing section 25 to the display section 11 and the speaker 26b, respectively.

The condition management section 22d manages conditions of the television control section 22a, the browser for data broadcasting 22b, the communication browser 22c and the display section 11 by the use of a management table 31 provided within the condition management section 22d, as illustrated in FIG. 3. Besides, it is expected that each section can take the following condition in the first embodiment.

The television control section 22a can take five conditions, stopping, executing, storage preparing, storing, and reproducing. The browser for data broadcasting 22b can take five conditions, stopping, proposing, storage preparing, storing, and reproducing. The communication browser 22c can take three conditions, stopping, proposal preparing, and proposing. The display section 11 can take three conditions, divided display, whole screen preparing, and whole screen display.

The contents of the management table 31 is utilized so that the control section 24 may recognize a condition of the mobile telephone apparatus 1 having television function at the time of generation of event. Namely, it is necessary that the control section 24 controls each section of the mobile telephone apparatus 1 having television function based on kinds of the generated event and a current condition of the mobile telephone apparatus 1 having television function. Therefore, the control section 24 recognizes a condition of the mobile telephone apparatus 1 having television function utilizing the management table 31.

For example, consideration is made about a case that an event requesting a proposal of the HTML contents is generated. If the content of the management table 31 is such one as illustrated in FIG. 3, the control section 24 judges that the mobile telephone apparatus 1 having television function is in a condition for watching the television. The control section 24 then conduct a pop up display for confirming whether the user hopes to watch the television continuously or the user hopes that the television program being watched is stored and HTML contents are displayed in a whole screen. Further, by the use of the condition management section 22d, the control section 24 changes a condition of each section managed by the management table 31 into that, the television control section 22a=storage preparing, the browser for data broadcasting 22b=storage preparing, the communication browser 22c=proposal preparing, the display section 11=whole screen preparing, respectively. Further, consideration is made about a case that the user inputs, through the pop up display, an indication that the television program being watched is stored and HTML contents are displayed in a whole screen. If the content of the management table 31 is such one as mentioned above, the control section 24 indicates the storage control section 23a that image data, voice data and contents for data broadcasting output from the tuner data processing section 29a are stored in the data storing section 23b. In addition, by the use of the condition management section 22d, the control section 24 changes a condition of each section managed by the management table 31 into that, the television control section 22a=storing, the browser for data broadcasting 22b=storing, HTML (Hyper Text Markup Language) browser 22c=proposing, the display section 11=whole screen display, respectively. Further, even if the event requesting a proposal of the HTML contents is generated, the control section 24 judges that the mobile telephone apparatus 1 having television function is in a condition of proposing the HTML contents with recording the television program, as far as the content of the management table 31 is such one as mentioned above. The control section 24 conducts a processing for obtaining the HTML contents of which the proposal is requested from the Internet through the wireless processing section 25.

The storage control section 23a has a function to store the image data, the voice data and the contents for data broadcasting output from the tuner data processing section 29a in the data storing section 23b.

In the data storing section 23b, the image data, the voice data and the contents for data broadcasting are stored by the storage control section 23a.

The wireless processing section 25. conducts a processing of communication with a mobile telephone network.

The voice processing section 26. conducts a processing of audio CODEC (Coder/Decoder). The voice processing section 26 also conducts input and output with the microphone 26a and the speaker 26b.

The display control section 27 has a function to compose screens (Icon, POP-UP message, movie, or the like) displayed in the display section 11 and to make the display section 11 display the composed screens.

The movie processing section 28 conducts a processing of video CODEC (Coder/Decodear). In a case of reproducing the movie, the movie processing section 28 transfers decoded image to the display control section 27.

The tuner control section 29b has a tuner module for receiving digital broadcast waves by terrestrial digital broadcast therein and controls the receiving frequency thereof. The digital broadcast waves include the image data, the voice data and the contents for data broadcasting (data broadcasting).

The tuner data processing section 29a has a function to recover and output the digital broadcast waves received by the tuner control section 29b.

In the mobile telephone apparatus 1 having television function, the input processing section 21, the television control section 22a, the browser for data broadcasting 22b, the communication browser 22c, the condition management section 22d, and the storing control section 23a can be realized by a CPU (computer). In a case that those are realized by the computer, for example, the followings are employed. Preparing a recording medium, such as a disk, a semiconductor memory, and the like in which a computer software program for making the computer function as the input processing section 21, the television control section 22a, the browser for data broadcasting 22b, the communication browser 22c, the condition management section 22d, the storing control section 23a and the control section 24 is recorded, and let the computer read the above computer software program. In accordance with the computer software program, the computer controls its operations and thereby realizes the input processing section 21, the television control section 22a, the browser for data broadcasting 22b, the communication browser 22c, the condition management section 22d, and the storing control section 23a in itself.

Description of Operations in the First Embodiment

Next, a detailed description will be made about operations of the first embodiment.

In a case that the user of the mobile telephone apparatus 1 having television function starts watching the television program, at first, the user conducts a key operation for making the television receiving function be effective by the use of the key input section 12. Thereafter, the user conducts a next key operation for selecting a broadcast station broadcasting a television program that he wants to watch by the use of the key input section 12.

The control section 24 is, through the input processing section 21, informed of the contents of the key operations that the user conducted.

On the basis of information from the input processing section 21, the control section 24 recognizes that the user conducted the key operation for making the television receiving function be effective. Then, the control section 24 starts the television control section 22a and the browser for data broadcasting 22b. In addition, the control section 24 instructs that the condition management section 22d changes the condition of each section managed by the management table 31 into that, the television control section 22a=executing, the browser for data broadcasting 22b=proposing, the communication browser 22c=stopping, the display section 11=divided display, respectively. In accordance with the instruction from the control section 24, the condition management section 22d changes the contents of the management table 31 into that illustrated in FIG. 4A.

Further, the control section 24, on the basis of the information from the input processing section 21, recognizes that the user conducted the key operation for selecting the broadcast station. Then, the control section 24 instructs the tuner control section 29b so that the receiving frequency may be determined to that of the broadcast station selected by the user.

Thereby, the image data, the voice data each of the television program that the user wants to watch and the contents for data broadcasting including link information to the information concerning the above television program and the like are output from the tuner data processing section 29a. The television control section 22a supplies the movie processing section 28, the voice processing section 26 with the above image data, the voice data, respectively. The browser for data broadcasting 22b supplies the display control section 27 with the image data for displaying images (including link information) in accordance with the above contents for data broadcasting.

In the voice processing section 26, voice in accordance with the voice data supplied from the television control section 22a is output from the speaker 26b. In the movie processing section 28, the movie data supplied from the television control section 22a is decoded to be supplied to the display control section 27. In the display control section 27, the image data from the browser for data broadcasting 22b and the data from the movie processing section 28 are composed (for example, screen division is conducted, wherein an image in accordance with the data from the movie processing section 28 is displayed in the upper portion of the display section 11 while an image in accordance with the image data from the browser for data broadcasting 22b is displayed in the lower portion of the display section 11) to be displayed in the display section 11.

Figure 5:
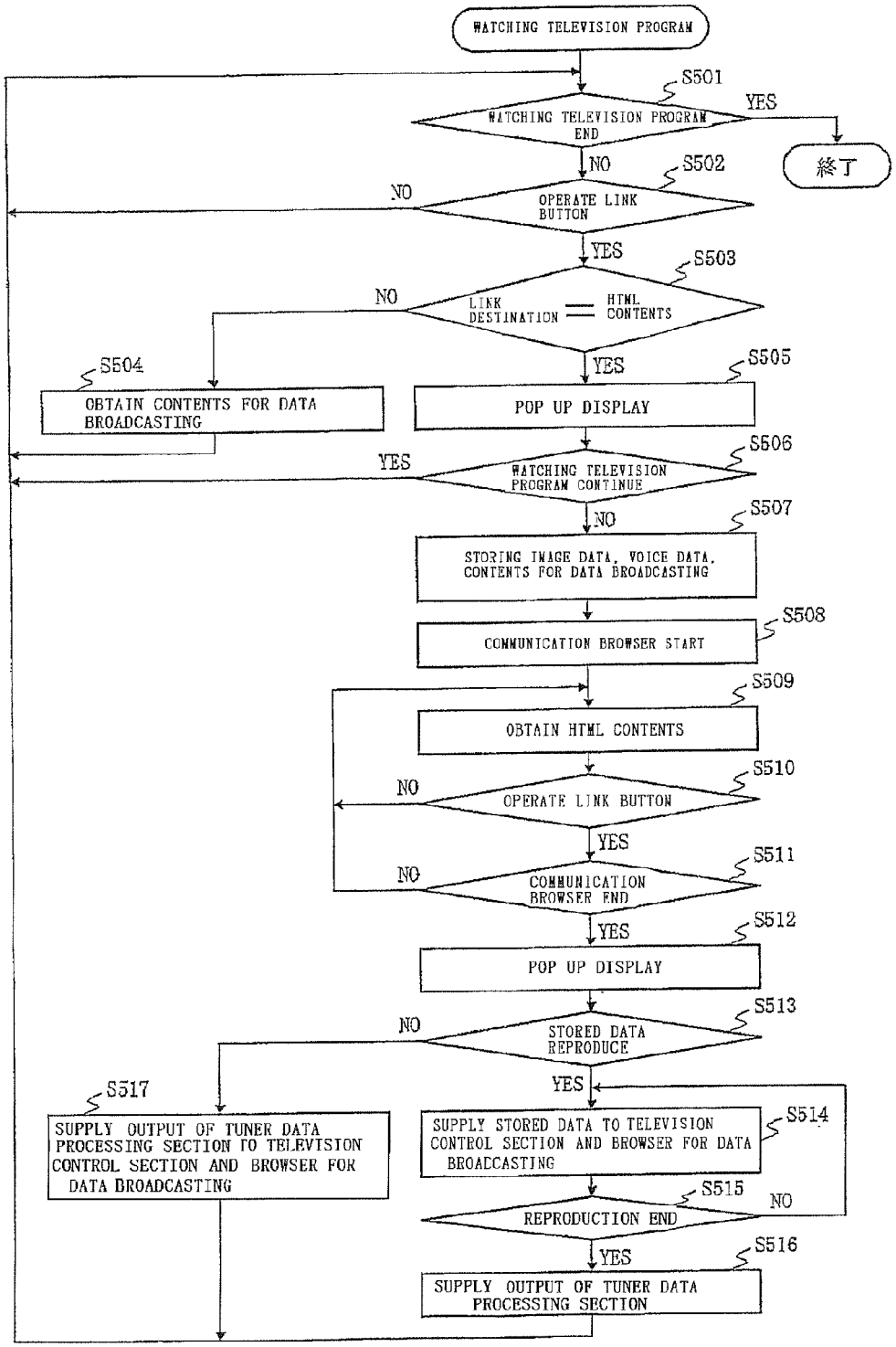
FIG. 5 is a flow chart for showing an example of processing (mainly a processing when link information is operated during watching a television program) of a control section 24 illustrated in FIG. 2.

Next, referring to a flow chart of FIG. 5, description proceeds to operations of the mobile telephone apparatus 1 having television function, in a case that the link information displayed in the display section 11 is operated by the user during watching the television.

In a case that the user wants to refer the information for the television program during watching the television program, the user operates the link information displayed in the display section 11. The link information is displayed by the browser for data broadcasting 22b. If the link information is operated (Step S502 is Yes), the browser for data broadcasting 22b transfers URL indicating its link destination to the control section 24.

Upon receiving the URL from the browser for data broadcasting 22b, the control section 24 judges whether the contents of the link destination is the contents for data broadcasting or the HTML contents on the basis of the received URL (step S 503). In the terrestrial digital broadcast, it is possible to propose the contents of the link destination at the same time as the television program in a case of the contents for data broadcasting (it is possible to propose the contents of the link destination and the television program in a divided screen). However, it is prescribed in use that the HTML contents are displayed in a whole screen by the communication browser 22c in a case of the HTML contents published on the Internet.

If the control section 24 judges that the contents of the link destination is the contents for data broadcasting that can be displayed in the divided screen (step S503 is No), the contents of the management table 31 are those illustrated in FIG. 4A (a condition of the mobile telephone apparatus 1 having television function is such a condition as watching television). Therefore, the control section 24 obtains the corresponding contents for data broadcasting in accordance with the URL transferred from the browser for data broadcasting 22b. The control section 24 then transfers the obtained contents for data broadcasting to the browser for data broadcasting 22b (step S 504). The browser for data broadcasting 22b thereby displays an image in accordance with the contents for data broadcasting transferred from the control section 24 in the display section 11 with the television program also being displayed therein in overlapping manner.

On the other hand, the control section 24 judges that the contents of the link destination is the HTML contents that must be displayed in a whole screen (step S503 is Yes), the content of the management table 31 is such one as illustrated in FIG. 4 (A). The control section 24 therefore conducts a pop up display for confirming whether the user hopes to watch the television continuously or the user hopes that the television program being watched is stored and the HTML contents are displayed in a whole screen. Further, the control section 24 instructs the condition management section 22d so that the conditions of the television control section 22a, the browser for data broadcasting 22b, the communication browser 22c, the display section 11, into storage preparing, storage preparing, proposal preparing, whole screen preparing, respectively. The condition management section 22d thereby changes the contents of the management table 31 into such one as illustrated in FIG. 4B (step S505).

Thereafter, in a case that the user instructs to watch the television program continuously by the use of the pop-up display (step S506 is Yes), the control section 24 returns to the processing of the step S501.

On the other hand, in a case that the user instructs that the television program being watched is stored and the HTML contents are displayed in a whole screen by the use of the pop-up display (step S506 is No), the contents of the management table 31 are those illustrated in FIG. 4B (a condition of the mobile telephone apparatus 1 having television function is such a condition as storage preparing). Therefore, the control section 24 instructs the storage control section 23a that the image data, the voice data and the contents for data broadcasting are stored in the data storing section 23b. In addition, the control section 24 stops the television control section 22a and the browser for data broadcasting 22b (step S507). In accordance with the instruction from the control section 24, the storage control section 23a sores the image data, the voice data and the contents for data broadcasting output from the tuner data processing section 29a in the data storing section 23b. Besides, in the first embodiment, the image data, the voice data and the contents for data broadcasting are stored in the data storing section 23b. However, a pop-up display may be conducted for inquiring the user whether all of the image data, the voice data and the contents for data broadcasting are stored or only the image data and the voice data are stored. Accordingly, such data as indicated by the user may be stored in the data storing section 23b.

Thereafter, since the contents of the management table 31 are such one as illustrated in FIG. 4B, the control section 24 starts the communication browser 22c. Further, the control section 24 instructs the condition management section 22d so that the conditions of the television control section 22a, the browser for data broadcasting 22b, the communication browser 22c, the display section 11, into storing, storing, proposing, whole screen display, respectively (step S508). Thereby, the condition management section 22d changes the contents of the management table 31 into that illustrated in FIG. 4C.

Thereafter, the control section 24 obtains the corresponding HTML contents from the Internet in accordance with the URL transferred from the browser for data broadcasting 22b. The control section 24 then transfers the obtained HTML contents to the communication browser 22c (step S 509). The communication browser 22c thereby displays the above HTML contents in the display section 11 with the HTML contents being displayed in a whole screen thereof.

Thereafter, if the user operates the link information within the HTML contents displayed in the display section 11 (step S510 is Yes), the communication browser 22c transfers the URL indicating the link destination to the control section 24. At this time, the contents of the management table 31 are those illustrated in FIG. 4C (a condition of the mobile telephone apparatus 1 having television function is such a condition as proposing the HTML contents, data storing condition). Therefore, the control section 24 obtains the HTML contents indicated by the above URL from the Internet. The control section 24 then transfers the obtained HTML contents to the communication browser 22c (step S509).

Thereafter, if the user indicates that the communication browser 22c is to be terminated (step S511 is Yes), the control section 24 stops the communication browser 22c. In addition, since the contents of the management table 31 are those illustrated in FIG. 4C, the control section 24 conducts a pop up display for confirming whether the user hopes to reproduce the stored data or the user hopes to watch the television continuously (step S512).

If the user indicates that the stored data should be reproduced (step S513 is Yes), the control section 24 looks that the contents of the management table 31 are those illustrated in FIG. 4C and therefore starts the television control section 22a and the browser for data broadcasting 22b. The control section 24 then supplies the image data and the voice data stored in the data storing section 23b to the television control section 22a. Further, the control section 24 supplies the contents for data broadcasting to the browser for data broadcasting 22b. Moreover, the control section 24 instructs that the condition management section 22d changes the conditions of the sections managed by the management table 31, namely, the television control section 22a, the browser for data broadcasting 22b, the communication browser 22c, the display section 11, into reproducing, reproducing, stopping, divided display, respectively (step S514). Thereby, the television program stored in the data storing section 23b can be reproduced. In addition, the contents of the management table 31 are changed into that illustrated in FIG. 4D.

Thereafter, if the user indicates that reproduction of the stored data is terminated (step S515 is Yes), the control section 24 stops supply of the stored data to the television control section 22a and the browser for data broadcasting 22b. Alternatively, the control section 24 starts supply of output data from the tuner data processing section 29a to the television control section 22a and the browser for data broadcasting 22b. Further, the control section 24 instructs that the condition management section 22d changes the conditions of the sections managed by the management table 31, namely, the television control section 22a, the browser for data broadcasting 22b, the communication browser 22c, the display section 11, into executing, proposing, stopping, divided display, respectively (step S516). Thereby, the television program being broadcasted at the present can be reproduced. In addition, the contents of the management table 31 are changed into that illustrated in FIG. 4A. Thereafter, the control section 24 returns to the processing of the step S501.

On the other hand, in a case that the user instructs that the television program being broadcasted at the present is to be reproduced (step S513 is No), the control section 24 starts the television control section 22a and the browser for data broadcasting 22b. In addition, the control section 24 supplies the data output from the tuner data processing section 29a to the television control section 22a and the browser for data broadcasting 22b. Further, the control section 24 instructs that the condition management section 22d changes the conditions of the sections managed by the management table 31, namely, the television control section 22a, the browser for data broadcasting 22b, the communication browser 22c, the display section 11, into executing, proposing, stopping, divided display, respectively (step S517). Thereby, the television program being broadcasted at the present can be reproduced. In addition, the contents of the management table 31 are changed into that illustrated in FIG. 4A. Thereafter, the control section 24 conducts the processing of the step S501.

The control section 24 conducts the above-mentioned processings repeatedly, until the user instructs to stop watching the television program (until the step S501 becomes Yes).

Besides, the description was not made in the above example, however, in the step S508, in a case that a predetermined time period has passed after starting the communication browser 22c and that the user does not instruct to stop the communication browser 22c, the control section 24 may conduct a pop up display for confirming whether or not the user hopes to store the data continuously. Further, if the user instructs to stop storing the data, the processing of storing the data by the storage control section 23a may be stopped.

Figure 6:
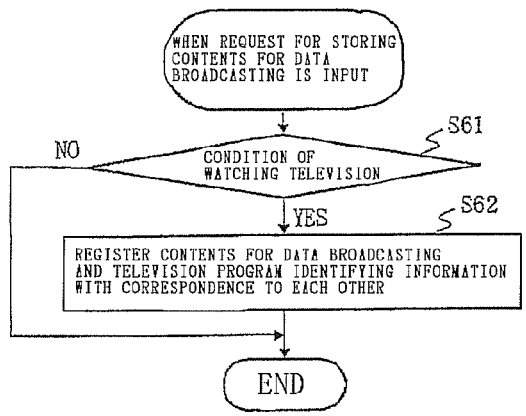
FIG. 6 is a flow chart for showing an example of processing of a control section 24 illustrated in FIG. 2, when a request for storing the contents for data broadcasting is input.

Next, referring to a flow chart of FIG. 6, description proceeds to operations of the mobile telephone apparatus 1 having television function, in a case that the user inputs a request for reserving the contents for data broadcasting through the key input section 12 during watching the television.

During watching the television program, the user sometimes hopes to access to the contents linked by the link information while the user hopes to continuously watching the television program. In such a case, the user inputs a request for reserving the contents for data broadcasting through the key input section 12.

If the request for reserving the contents for data broadcasting is input, the control section 24, at first, judges whether or not the condition of the mobile telephone apparatus 1 having television function is a condition of watching television with reference to the management table 31 (step S61). Namely, in a case that the contents of the management table 31 are that illustrated in FIG. 4A, the control section 24 judges that the condition of the mobile telephone apparatus 1 having television function is a condition of watching television.

In the interim, if the control section 24 judges that the condition of the mobile telephone apparatus 1 having television function is not a condition of watching television (step S61 is No), the control section 24 terminates the processing. On the other hand, if the control section 24 judges that the condition of the mobile telephone apparatus 1 having television function is a condition of watching television (step S61 is Yes), the control section 24 instructs that the browser for data broadcasting 22b stores the contents for data broadcasting (including link information) being displayed at the present and television program identifying information for identifying the television program being watched at the present are stored in the data storing section 23b (step S62). Thereby, the browser for data broadcasting 22b makes the contents for data broadcasting being displayed at the present and the television program identifying information be corresponding to each other and then stored in the data storing section 23b. Besides, for example, a name of a television program can be used as the television program identifying information.

Effects in the First Embodiment

According to the first embodiment, it is possible to obtain technical effects that the user can later watch the contents of the television program broadcasted while the user is watching an HTML contents, if proposal of the HTML contents is indicated by the user during watching the television program. The reason is that the image data and the voice data transmitted through the digital broadcast waves are sequentially stored in the data storing section, in a case that the proposal of the HTML contents is indicated by the user during watching the television program, namely in a case that a start of the communication browser 22c for conducting a whole screen display is indicated.

Further, in the first embodiment, in a case that the request for reserving the contents for data broadcasting is input by the user during watching the television program, the link information included in the contents for data broadcasting being displayed at the present is stored in the data storing section 23b. It therefore becomes possible to firmly obtain an information of the link destination in accordance with the above link information after the watching of the television program has been finished. Furthermore, in the first embodiment, the link information and the television program identifying information, such as a name of a television program are made to be corresponding to each other and then stored in the data storing section 23b. The user therefore can readily recognize a correspondence of link information and television programs with each other.

Second Embodiment of the Present Invention

Next, description will proceed to a second embodiment of the present invention. The second embodiment is characterized in that the image data, the voice data and the contents for data broadcasting each of the television program being watched are stored, not only in a case that the HTML contents are displayed in a whole screen by the communication browser during watching the television program but also in a case that the other application programs each for conducting a display in a whole screen are started.

Figure 7:
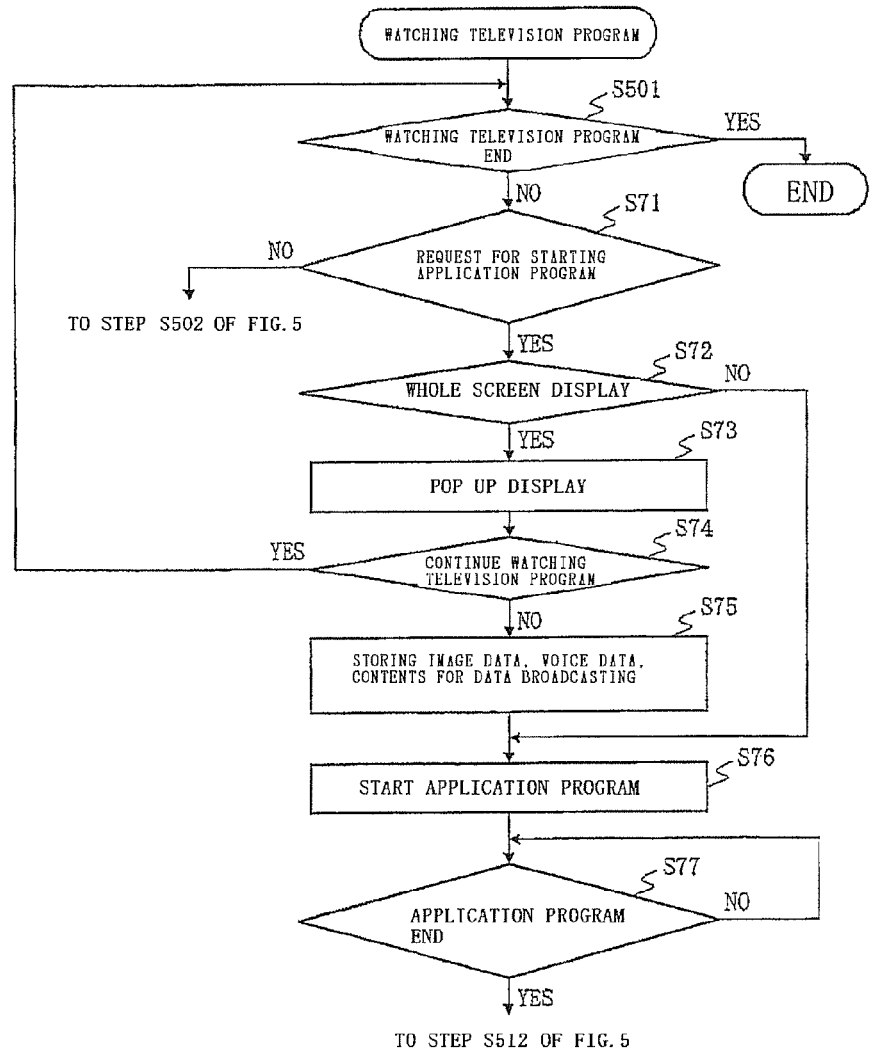
FIG. 7 is a flow chart for showing an example of processing of a control section 24 according to a second embodiment of the present invention.

The second embodiment is realized by making the control section 24 of the mobile telephone apparatus 1 having television function illustrated in FIG. 2 conduct a processing shown in a flow chart of FIG. 7 instead of a processing shown in a flow chart of FIG. 5. The flow chart of FIG. 7 is different from the flow chart of FIG. 5 by adding steps S71 to S77. Hereunder, description is made about these different points.

If the user, during watching the television program, inputs a request for starting an application program including a name thereof by the use of the key input section 12 (step S71 of FIG. 7 is Yes), the control section 24 judges whether or not the application program of which a start is requested conducts a display in a whole screen (step S72). For example, preparing screen kinds information table registering, with correspondence to each program name of each application program installed in the mobile telephone apparatus 1 having television function, screen kinds information indicating whether the application program conducts a display in a whole screen or a divided display, the judgment is conducted by referring the screen kinds information table. Namely, on the basis of the screen kinds information registered with correspondence to each program name included in a request for starting the application program, the control section 24 judges whether or not the application program is such one as conducting a display in a whole screen. Besides, if the result of judgment of step S71 is No, the control section 24 conducts a processing similar to the processing after step S502 in FIG. 5.

Further, in a case that the control section 24 judges that the application program is such one as conducting a display in a whole screen (step S72 is Yes), the control section 24 conducts a pop up display for confirming whether the user hopes to watch the television continuously or the user hopes to store the television program being watched and then a whole screen display is conducted by the application program (step S73).

Through this pop up display, in a case that the user instructs to watch the television program continuously (step S74 is Yes), the control section 24 returns the processing of the step S501. On the other hand, in a case that the user instructs that the television program being watched is stored and then a whole screen display is conducted by the application program (step S74 is No), the control section 24 instructs the storage control section 23a that the image data, the voice data and the contents for data broadcasting are stored in the data storing section 23b. In addition, the control section 24 stops the television control section 22a and the browser for data broadcasting 22b (step S75). In accordance with the instruction from the control section 24, the storage control section 23a sores the image data, the voice data and the contents for data broadcasting output from the tuner data processing section 29a in the data storing section 23b.

Thereafter, the control section 24 starts an application program of which a start is requested (step S76). Besides, if the result of judgment of step S72 is No, the control section 24 also starts an application program of which a start is requested (step S76). After this, a processing in accordance with the application program is conducted, until termination of the application program is instructed. If the termination of the application program is instructed (if step S77 becomes Yes), the control section 24 conducts a processing similar to the processing after step S512 in FIG. 5.

Effects in the Second Embodiment

According to the second embodiment, in addition to the effects provided by the first embodiment, it is possible to obtain technical effects that an user can later watch the contents of the television program broadcasted while conducting a display in a whole screen by the application program, even if start of the application program for conducting the display in the whole screen is indicated by the user during watching the television program. The reason is that the image data and the voice data transmitted through the digital broadcast wave are sequentially stored in the data storing section 23b, in a case that start of an application program for conducting a display in a whole screen is indicated by the user during watching the television program.

POSSIBILITY OF INDUSTRIAL USE

The present invention can be applied to mobile equipments, such as a mobile telephone apparatus having television function capable of receiving terrestrial digital broadcast, and the like.

The invention claimed is:

1. A mobile equipment having television function, which renders an user to watch a television program, characterized in that said mobile equipment comprises:
   a data storing section for storing image data and voice data transmitted through digital broadcast wave; and
   a display control section for conducting a display with a predetermined timing for confirming whether said user has decided to watch the television continuously or said user has decided that the television program being watched is stored, in a case that start of an application program preventing said user from continuing to watch said television program is indicated by said user.

2. A mobile equipment having television function as claimed in claim 1, further characterized in that, in a case that a predetermined time period has passed after starting the application program, said display control section conducts a display for confirming whether or not the user has decided to store the data continuously and the processing of storing the data by the data storing section is stopped, in a case that stopping storing the data is instructed by the user.

3. A mobile equipment having television function, which renders an user to watch a television program, characterized in that said mobile equipment comprises:
   a data storing section for storing image data and voice data transmitted through digital broadcast wave; and
   a display control section for conducting a display with a predetermined timing for confirming whether said user has decided to watch the television continuously or said user has decided that the television program being watched is stored, in a case that presentation of HTML contents is indicated by said user.

4. A mobile equipment having television function as claimed in claim 3, further characterized in that the mobile equipment having television function comprises: a constitution for storing also said contents for data broadcasting transmitted through said digital broadcast wave in said data storing section in addition to said image data and said voice data, in a case that presentation of said HTML contents is indicated by said user during watching said television program.

5. A mobile equipment having function as claimed in claim 3, further characterized in that said contents bar data broadcasting include a link information to said HTML contents and that said mobile equipment having television function comprises: a constitution for storing said link information included in said contents for data broadcasting being displayed at the present in said data storing section, in a case that a request for storing said contents for data broadcasting is input by said user during watching said television program.

6. A mobile equipment having television function as claimed in claim 5, further characterized in that said link information is stored with correspondence to a television program identification information for identifying a television program being watched by said user at the present, when said link information is stored in said data storing section.

7. A mobile equipment having television function as claimed in claim 3, further characterized in that, in a case that a predetermined time period has passed after presentation of said HTML contents, said display control section conducts a display for confirming whether or not the user has decided to store the data continuously and the processing of storing the data by the data storing section is stopped, in a case that stopping storing the data is instructed by the user.

8. A mobile equipment having television function comprises:
a display section;
a voice output section;
a digital broadcast wave receiving section for receiving digital broadcast waves including image data, voice data, and contents for data broadcasting;
a television control section which displays an image corresponding to said image data included in said digital broadcast waves received by said digital broadcast wave receiving section in a part of said display section and which outputs a voice corresponding to said voice data included in said digital broadcast waves from said is output section;
a browser for data broadcasting which displays an image including said link information corresponding to said contents for data broadcasting included in said digital broadcast waves received by said digital broadcast wave receiving section in another part of said display section were no image is displayed by said television control section;
a control section for determining whether contents of link destination of an operated link information are said HTML contents or said contents for data broadcasting, when said link information displayed in said display section is operated;
a communication browser which displays and outputs a voice corresponding to said HTML contents to said display section and said voice output section in spite of said television control section, in a case that said contents of link destination are determined by said control section to be said HTML contents; and
a data storing section for storing image data and voice data received by said digital broadcast wave receiving section; and
a display control section for conducting a display with a predetermined timing for confirming whether said user has decided to watch the television continuously or said user has decided that the television program being watched is stored, in a case that said control section determined that contents of link destination of an operated link information are said HTML contents.

9. A mobile equipment having television function as claimed in claim 8, further comprising a constitution for also storing said contents for data broadcasting included in said digital broadcast waves received by said digital broadcast wave receiving section in addition to said image data and said voice data.

10. A mobile equipment having television function as claimed in claim 8, further comprising a constitution for storing said link information within said contents for data broadcasting displayed at the present in said display section in said data storing section, when a request of storing is input by said user.

11. A mobile equipment having television function as claimed in claim 10, further comprising a constitution for storing said link information with correspondence to a television program identification information for identifying a television program being watched at the present, when said storage control section stores said link information in said data storing section.

12. A mobile equipment, having television function as claimed in claim 8, further characterized in that, in a case that a predetermined time period has passed after starting the communication browser, said display control section conducts a display for confirming whether or not the user has decided to store the data continuously and the processing of storing the data by the data storing section is stopped, in a case that stopping storing the data is instructed by the user.

13. A method of storing a television program information in a mobile equipment having television function which renders an user to watch a television program, comprises:
a step for storing image data and voice data transmitted through digital broadcast wave in a data storing section; and
a step for conducting a display with a predetermined timing for confirming whether said users has decided to watch the television continuously or said user has decided that the television program being watched is stored, in a case that start of an application program preventing said user from continuing to watch said television program is indicated by said user.

14. A method of storing a television program information in a mobile equipment having television function as claimed in claim 13, further characterized in that, in a case that a predetermined time period has passed after starting the application program, a display for confirming whether or not the user has decided to store the data continuously is conducted and the processing of storing the data by the data storing section is stopped, in a case that stopping storing the data is instructed by the user.

15. A method of storing a television program information in a mobile equipment having television function which renders an user to watch a television program, comprises:
a step for storing image data and voice data transmitted through digital broadcast wave in a data storing section; and
a step for conducting a display with a predetermined timing for confirming whether said user has decided to watch the television continuously or said user has decided that the television program being watched is stored, in a case that presentation of HTML contents is indicated by said user.

16. A method of storing a television program information in a mobile equipment having television function as claimed in claim 15, further characterized in that said contents for data broadcasting transmitted through said digital broadcast wave are also stored in said data storing section in addition to said image data and said voice data, in a case that presentation of said HTML contents is indicated by said user during watching said television program.

17. A method of storing a television program information in a mobile equipment having television function as claimed in claim 15, further characterized in that said contents for data broadcasting include a link information to said HTML contents and that said link information included in said contents for data broadcasting being displayed at the present is stored in said data storing section, in a case that a request for storing said contents for data broadcasting is input by said user during watching said television program.

18. A method of storing a television program information in a mobile equipment having television function as claimed in claim 17, further characterized in that said link information is stored with correspondence to a television program identification information for identifying television program being watched by said user at the present, when said link information is stored in said data storing section.

19. A method of storing a television program information in a mobile equipment having television function as claimed in claim 15, further characterized in that, in a case that a predetermined time period has passed after presentation of said HTML contents, conducting a display for confirming whether or not the user has decided to store the data continuously and the processing of storing the data by the data storing section is stopped, in a case that stopping storing the data is instructed by the user.

20. A computer software program which is to make a computer as a mobile equipment having television function which renders an user to watch a television program, characterized in that said computer software program makes said computer function as
means for storing image data and voice data transmitted through digital broadcast wave in a data storing section; and
means for conducting a display with a predetermined timing for confirming whether said user has decided to watch the television continuously or said user has decided that the television program being watched is stored, in a case that start of an application program preventing said user from continuing to watch said television program is indicated by said user.

21. A computer software program as claimed in claim 20, farther characterized in that said computer software program makes said computer function as
means for, in a case that a predetermined time period has passed after starting the application program, conducting a display for confirming whether or not the user has decided to store the data continuously and the processing of storing the data by the data storing section is stopped, in a case that stopping storing the data is instructed by the user.

22. A computer software program which is to make a computer having a data storing section function as a mobile equipment having television function which renders an user to watch a television program, characterized in that said computer software program makes said computer function as
means for storing image data and voice data transmitted through digital broadcast wave in a data storing section; and
means for conducting a display with a predetermined timing for confirming whether said user has decided to watch the television continuously or said user has decided that the television program being watched is stored, in a case that presentation of HTML contents is indicated by said user.

23. A computer software program as claimed in claim 22, further characterized in that said means comprises: a constitution for storing also said contents for data broadcasting transmitted through said digital broadcast wave in said data storing section in addition to said image data and said voice data, in a case that presentation of said HTML contents is indicated by said user during watching said television program.

24. A computer software program as claimed in claim 22, further characterized in that said contents for data broadcasting include a link information to said HTML contents and that said mobile equipment having television function comprises: a constitution for storing said link information included in said contents for data broadcasting being displayed at the present in said data storing section, in a case that a request for storing said contents for data broadcasting is input by said user during watching said television program.

25. A computer software program as claimed in claim 24, further characterized in that said means comprising a constitution for storing said link information with correspondence to a television program identification information for identifying a television program being watched at the present, when said storage control section stores said link information in said data storing section.

26. A computer software program as claimed in claim 22, characterized in that said computer software program farther makes said computer function as
means for, in a case that a predetermined tune period has passed after presentation of said HTML contents, conducting a display for confirming Whether or not the user has decided to store the data continuously and stopping the processing of storing the data by the data storing section, in a case that stopping storing the data is instructed by the user.

* * * * *